(12) United States Patent
Lafay et al.

(10) Patent No.: US 6,476,878 B1
(45) Date of Patent: Nov. 5, 2002

(54) METHOD AND APPARATUS FOR AUDIO SIGNAL PROCESSING

(75) Inventors: William P. Lafay, Snellville, GA (US); Robert C. Cheng, Duluth, GA (US); Benny Hsu, Lawrenceville, GA (US); Martin Taylor, Lithonia, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/176,676

(22) Filed: Oct. 21, 1998

(51) Int. Cl.[7] .............................. H04N 5/46; H04N 5/60; H04N 3/24; H04B 15/00; H04B 7/00; H04B 1/10

(52) U.S. Cl. .................... 348/738; 348/736; 348/555; 348/632; 381/94.5; 455/286; 455/266; 455/307

(58) Field of Search ....................... 348/738, 736, 348/632, 555, 735; 725/151, 139; 381/13, 14, 94.5, 56; 455/286, 266, 307

(56) References Cited

U.S. PATENT DOCUMENTS

| 3,842,198 | A | * | 10/1974 | Martin | ....................... 348/632 |
|---|---|---|---|---|---|
| 5,125,105 | A | * | 6/1992 | Kennedy et al. | .......... 455/164.1 |
| 5,138,457 | A | * | 8/1992 | Sakai et al. | ................. 348/738 |
| 5,220,602 | A | * | 6/1993 | Robbins et al. | ............... 380/20 |
| 5,532,762 | A | * | 7/1996 | Sakai et al. | ................. 348/738 |
| 6,016,352 | A | * | 1/2000 | Barmore | .................... 381/94.5 |
| 6,147,713 | A | * | 11/2000 | Robbins et al. | ............. 348/555 |
| 6,157,726 | A | * | 12/2000 | Carroll et al. | ............. 381/94.5 |

* cited by examiner

Primary Examiner—John Miller
Assistant Examiner—Paulos Natnael
(74) Attorney, Agent, or Firm—Kenneth M. Massaroni; Hubert J. Barnhardt III; Shelley L. Couturier

(57) ABSTRACT

The method, apparatus, and system for controlling audio anomalies by using a mute switch 51 to prevent output of an auxiliary audio signal 21 in a television signal 20 with an auxiliary audio signal 21, such as a NICAM audio signal or dual language audio signal, adjacent to a first audio signal 22. The mute switch 51 operation is a function of the type of receiver 19 receiving television signal 20 and a function of verifying the presence of an auxiliary audio signal 21 in television signal 20. The present invention controls audio anomalies such as audio whistle and audio pop.

3 Claims, 3 Drawing Sheets

METHOD AND APPARATUS FOR AUDIO SIGNAL PROCESSING

FIELD OF THE INVENTION

This invention relates in general to controlling audio anomalies and in particular to controlling audio anomalies in signals which have an auxiliary audio signal or dual language audio signal adjacent to a main audio signal.

BACKGROUND OF THE INVENTION

Audio anomalies occur in a variety of signals such as in the television signals of a television system which has an auxiliary audio signal adjacent to a main audio signal. An understanding of the system in which a signal occurs can help define the causes of the audio anomalies. A television system is used to illustrate the audio anomalies which occur with a signal having an auxiliary audio signal adjacent to a main audio signal.

Television system 10 as illustrated in FIG. 1, includes a headend 14 which receives input programming from input sources 12(a–c). Headend 14 combines the programming from the various input sources 12(a–c) into a television signal with multiple channels and modulates and distributes the television signal to subscriber locations (e.g., subscriber location 17) via distribution system 16. The audio options associated with the multiple channels will vary. Some channels will be available in either monophonic or stereo sound, others will only be available in monophonic sound. Some channels may have an optional second audio language. At subscriber location 17 an intermediate device, such as a home communication terminal (HCT) 18 or a set-top, interfaces to distribution system 16 and to receiver 19. Receiver 19 can be a monophonic television, a stereo television, an audio only stereo receiver, or a computer. HCT 18 allows access to the auxiliary audio options as an additional service of television system 10. The options are unique to each television system 10. For example, a television system 10 may have auxiliary audio signaling on all channels, such as a second audio language for every channel. Another television system 10 may have no auxiliary audio signaling, while another may have auxiliary audio signaling on one or more channels. Television signal 20 contains multiple channels. FIG. 2 is a graphic representation illustrating the components of a single channel within multi-channel television signal 20 having auxiliary audio signal 21 adjacent to main audio signal 22. The components also include video signal 24 and color signal 26. The auxiliary audio signal 21 is provided because additional languages and stereo sound are available and in demand by subscribers paying for access to television signal 20. The auxiliary audio signal 21 may be, for example, Near Instantaneously Companded Audio Multiplex (NICAM) audio signals or dual language audio signals. It is important to note that, even in systems designed for multiple audio signals, auxiliary audio signal 21 may not be present on every programming channel in television signal 20. A set-top, HCT 18, or any television can process main audio signal 22. The reception or processing of auxiliary audio signal 21 can be limited by several factors such as the type of receiver 19, system controlled conditional access within television system 10, and the availability of additional audio on auxiliary audio signal 21.

The multiple channels occur at a set spacing based on the format of television signal 20. In Phase Alteration (by) Line type B (PAL-B) and PAL-G formats the channel spacing is 7 MHz. The location of television signal 20 components is also fixed within the total channel allocation based on the format. The location of main audio signal 22 is offset from the video signal by a fixed frequency. For example, the National Television System Committee (NTSC) format uses a frequency offset of 4.5 Megahertz (MHz), a PAL-I format uses a 6.0 MHz frequency offset, and PAL-B and PAL-G formats use a 5.5 MHz frequency offset.

Audio anomalies are most prevalent in PAL-B, -PAL-G, and PAL-B/G hybrid formats due to the close channel spacing, but have occurred in other formats such as PAL-I. A PAL-B signal format is used for all examples unless stated otherwise. In a PAL-B or PAL-G system additional limitations such as a total channel allocation of only 7 MHz impacts the audio signals. The main audio signal 22 is frequency offset from the video carrier by 5.5 MHz. The auxiliary audio signal 21 is frequency offset from the video carrier by 5.85 MHz. With limited space within the total channel allocation, the auxiliary audio signal 21 is located at only 350 Kilohertz (KHz) above the main audio signal 22. Conversely, in a PAL-I system the auxiliary audio signal 21 is located at 552 KHz above the main audio signal 22. In theory the close spacing of the two audio signals is not a problem as the main audio signal 22 would occur right at 5.5 MHz, however when the main audio signal 22 is modulated there is a spread around 5.5 MHz as shown by the shaded region in FIG. 2. The close proximity of the two audio signals in a PAL-B or PAL-G system creates audio anomalies when filtering out one audio signal to receive the other.

One audio anomaly created in the filtering process is a constant tone generated on a television using the main audio, a monophonic audio. The constant tone is referred to as "audio whistle". Audio whistle occurs when a portion of the main audio signal 22 is processed through the auxiliary audio signal processing circuitry or when signal interference occurs due to the layout of the components within HCT 38. Due to the close proximity of the two signals, filters designed to isolate the auxiliary audio signal 21 capture a small portion of the spread main audio signal 22, for example a portion of the main audio signal 22 at 5.5 MHz. Thus, when the signals are recombined in the output of HCT 18, there are two components of the 5.5 MHz main audio signal 22 with different amplitudes and only slightly different or the same frequencies. One of the components is generated by processing main audio signal 22. The other component is the portion of the main audio signal 22 that was processed through the auxiliary audio signal 21 circuitry. The additional component results in the generation of a constant tone signal, the audio whistle. Attempts to eliminate audio whistle have resulted in the creation of additional problems.

One proposed solution involves locking the main audio signal 22 output frequency to the main audio signal 22 input 5.5 frequency. This solution was unsuccessful as the main audio signal 22 input when modulated had signal spread and the resultant signal lock constantly shifted resulting in a loss of volume control.

A second proposed solution involved designing a deeper notch separating the two signals. Created using devices such as sound traps or filters, a deeper notch or gap between the main audio signal 22 and the auxiliary audio signal 21 allows easier separation of the two signals. Easier separation allows for an easier removal of the main audio signal 22 in the auxiliary audio signal 21 processing circuitry, thus no additional main audio signal 22 component remains in the recombined signal. A deeper notch while currently used in the art, creates additional problems such as audio pop. Audio pop is an instantaneous crackle or popping sound on the stereo or dual language audio.

Attempts to solve these audio anomaly problems included expensive sophisticated filters which still often result in audio popping. Modifying the response of the auxiliary audio signal 21 circuitry to create a deeper notch is also currently being done in the art, but has been found to still result in both some level of audio whistle and some audio pop. Indeed, because the causes and solutions of the audio whistle and audio pop are not easily understood, many cable television systems having multiple audio signals suffer from these audio anomalies.

Thus, what is needed is a better understanding of what is causing the audio anomaly problems and a method, apparatus, and system for eliminating them in signals which may have an auxiliary audio signal 21 adjacent to a main audio signal 22. The solution should be easy to implement, cost effective, and not introduce additional problems into HCT 18.

DETAILED DESCRIPTION

Figure 1:
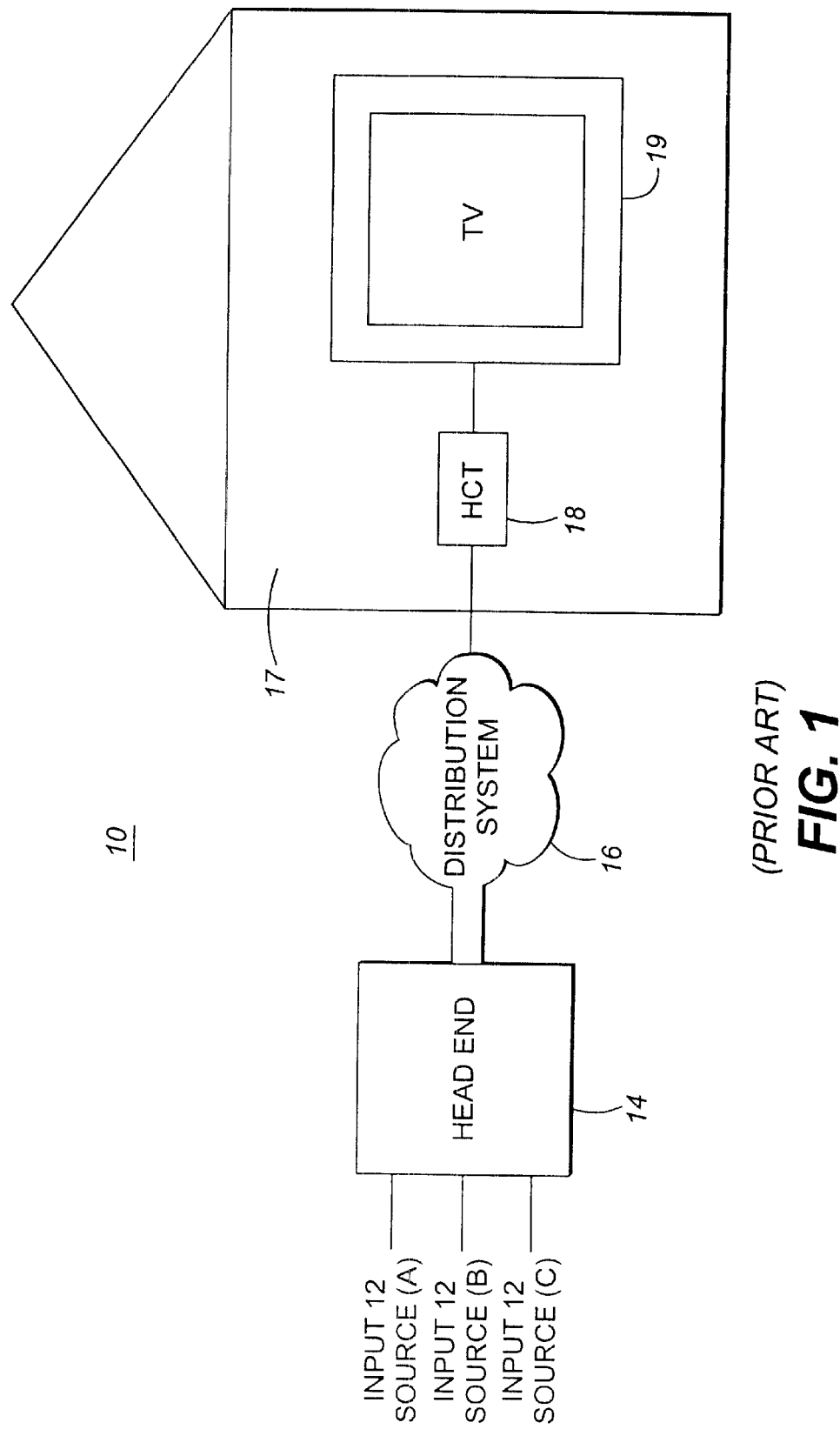
FIG. 1 is a block diagram representation of television system 10.
Figure 2:
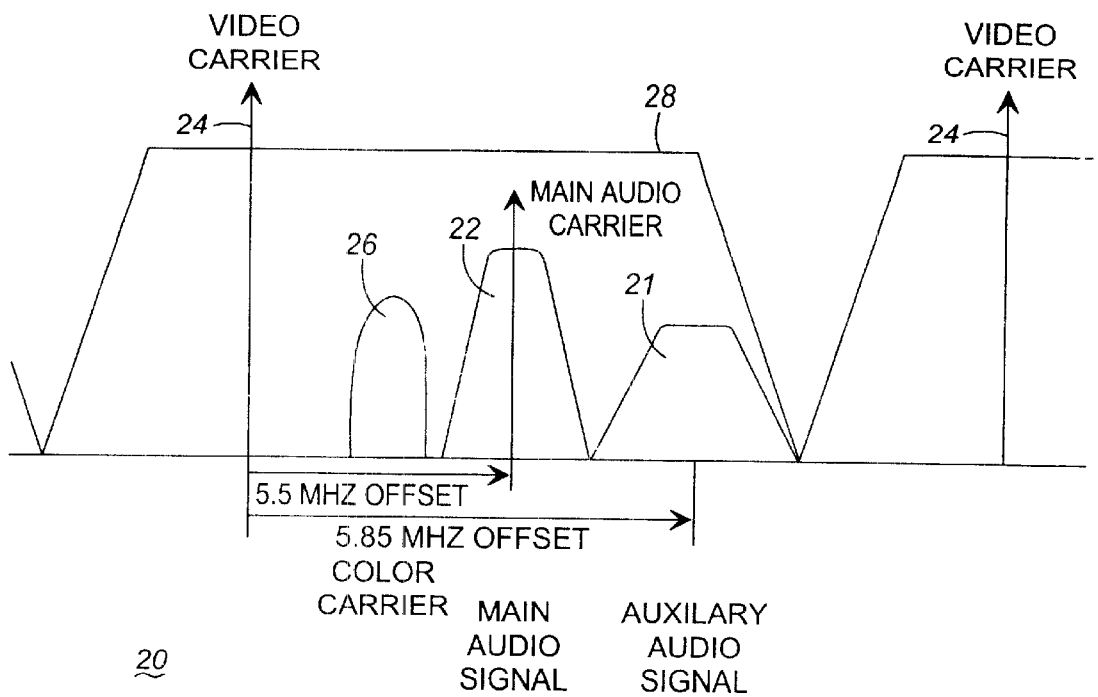
FIG. 2 is a graphic representation illustrating the components of television signal 20 with auxiliary audio signal 21 adjacent to main audio signal 22.

The present invention provides a method, apparatus, and system for controlling audio anomalies in signals such as television signals, that have a first and second audio signal or multiple audio signals. Multiple audio signals include examples such as an auxiliary audio signal 21 adjacent to a main audio signal 22. In an exemplary embodiment, the present invention provides a method for controlling audio whistle and audio pop in PAL-B, PAL-G, and PAL-B/G hybrid television systems with NICAM digital stereo audio signals. A PAL-B/G hybrid format includes a portion of the television signal formatted in the PAL-B format and a portion of the television signal formatted in the PAL-G format. This exemplary embodiment includes a method for separating and processing auxiliary audio signal 21 and for preventing the recombination of auxiliary audio signal 21 with the output of HCT 18. Based on the presence of auxiliary audio signal 21 and receiver 19 type, recombination is allowed or disallowed.

Referring now to the drawings, in which like numerals represent like elements throughout the several figures, the present invention will be described.

Figure 3:
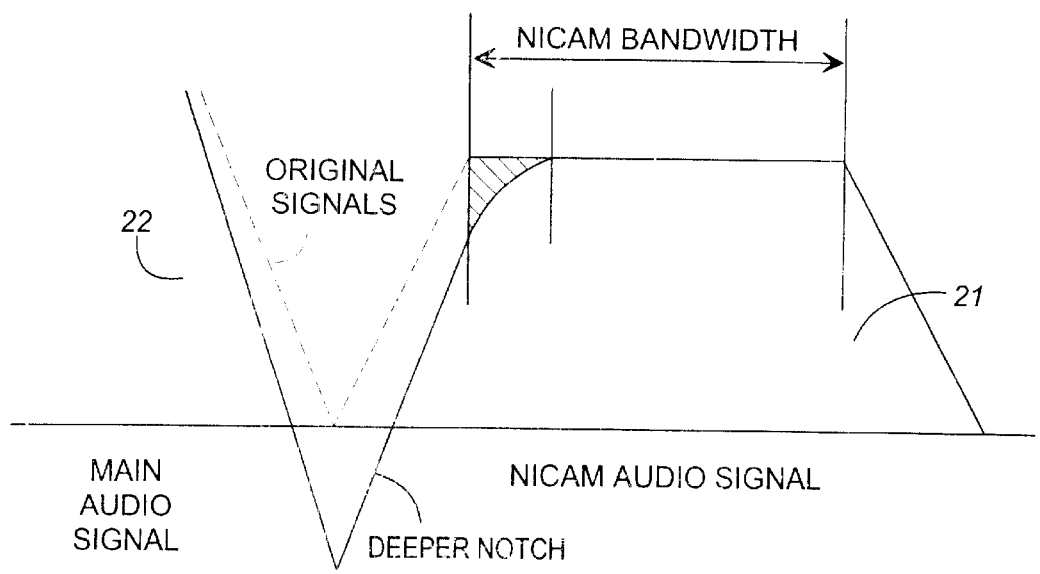
FIG. 3 is a graphic representation illustrating the impact of a deeper notch on a NICAM audio signal.

Using current art a deeper notch solution was implemented, but surprisingly additional unexpected audio anomalies occurred. FIG. 3 is a graphic representation illustrating the impact of a deeper notch on a NICAM audio signal. A deeper notch is created using sound traps, filters, or by other methods well known in the art. The deeper notch does reduce the introduction of main audio signal 22 into the auxiliary audio signal processing. The deeper notch also narrows the NICAM filter bandwidth, as shown by the shaded region in FIG. 3, causing excessive group delay in the NICAM signal. NICAM detection circuitry in receiver 19 shifts to the main audio signal 22 when no NICAM signal is detected or when NICAM signal distortion occurs due to excessive group delay. It was discovered that the excessive group delay results in the NICAM circuitry in receiver 19 shifting rapidly between main audio signal 22 and the NICAM formatted auxiliary audio signal 20. The rapid shift causes audio pop.

It was further discovered during investigation that the audio anomalies occur in systems with auxiliary audio signal 21 and a HCT 18 or set-top processing auxiliary audio signal 21 prior to receiver 19. The audio anomalies occur in these systems when a stereo television tunes to a channel with only monophonic audio or when a monophonic television tunes to a channel with an auxiliary audio signal 21.

The present invention provides an easy to implement and cost effective solution to audio anomalies without introducing additional problems into HCT 18. The introduction of circuitry to selectively eliminate the recombination of auxiliary audio signal 21 into the signal being output from HCT 18 to receiver 19, provides this easy and cost effective solution. The elimination of the output of auxiliary audio signal 21 is based on the type of receiver 19 connected to HCT 18 and on the presence of an auxiliary audio signal 21. The NICAM processing circuitry shown in an exemplary embodiment is typical of auxiliary audio processing circuitry but the present invention is not so limited as to the circuitry shown. Other methods of processing an auxiliary audio signal 21 and methods of preventing the recombination of auxiliary audio signal 21 with the output to receiver 19 are well known in the art. For example the present invention would work with the inclusion of a notch filter in the auxiliary audio processing circuitry, with different types of auxiliary audio detection circuitry, or with different methods of determining the type of receiver 19 attached to HCT 18. The present invention also works with different types of auxiliary audio signal 21 formats such as the NICAM format and formats for a second audio language signal.

The circuitry required for processing auxiliary audio signal 21 can be comprised of any of a multitude of devices or combinations of devices such as band pass filters, amplifiers, and sound traps. The type and configuration of the devices will vary based on the type and format of the auxiliary audio signal 21 to be processed and the processing required. Based on design requirements the circuitry and devices for detecting the presence of an auxiliary audio signal 21, for receiving input of the type of receiver 19 to which the auxiliary audio signals 21 will be output, for preventing the output of auxiliary audio signal 21 to the receiver 19 can also be varied.

Figure 4:
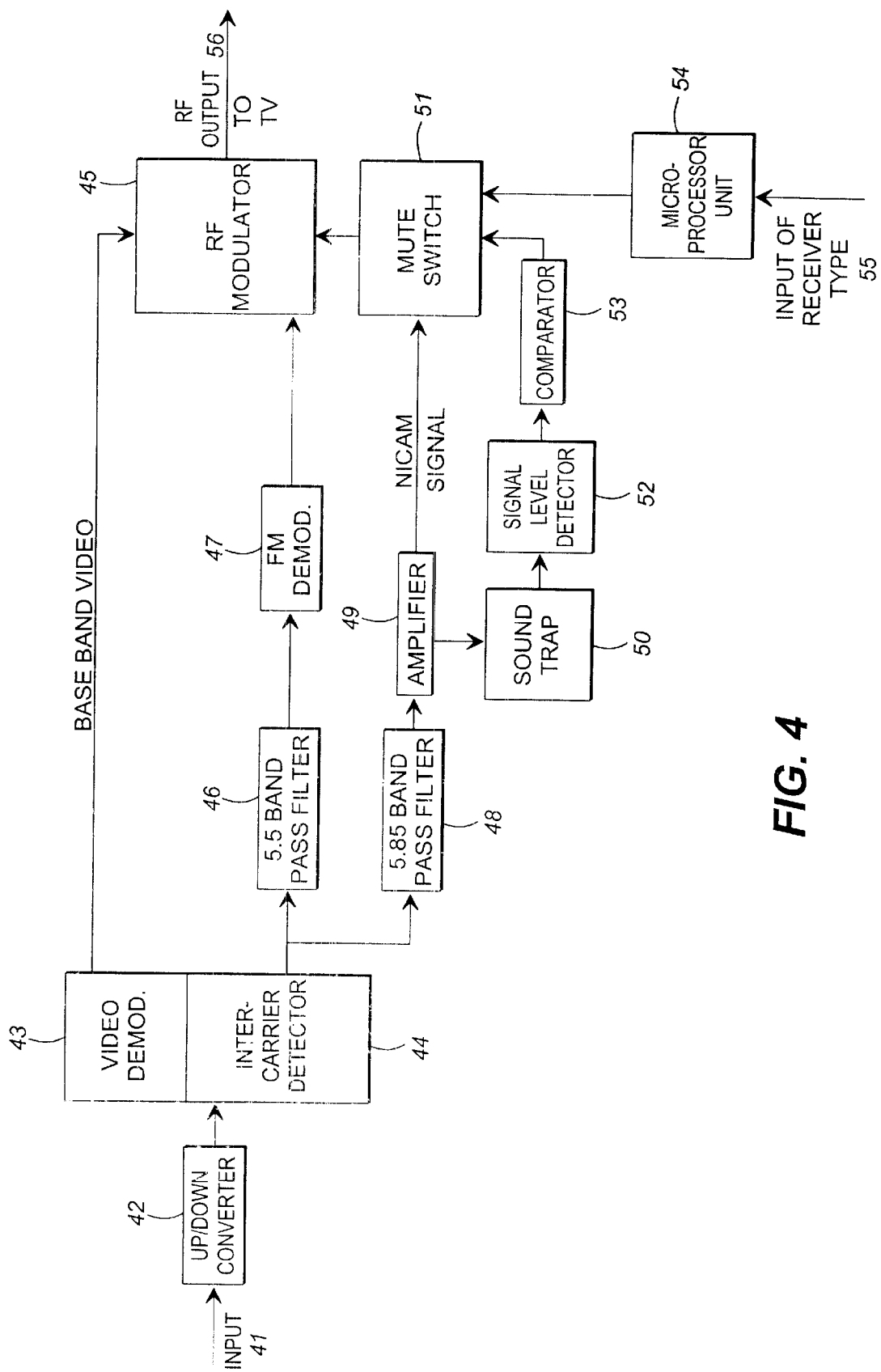
FIG. 4 is a block diagram representation of the portion of HCT 18 of FIG. 1 which process incoming audio signals, in accordance with the present invention.

FIG. 4 is a representation of the portion of HCT 18 of FIG. 1 which processes incoming audio signals and selectively eliminates the recombination of auxiliary audio signal 21 into the signal being output from HCT, 18 to receiver 19, in accordance with the present invention. In particular, FIG. 4 illustrates, in block diagram fashion, an apparatus for controlling audio anomalies, including a 5.85 MHz band pass filter 48, signal level detector 52, mute switch 51, amplifier 49, sound trap 50, comparator 53, and microprocessor unit (MPU) 54 of the present invention. The input signal 41 from distribution system 16 is received and adjusted for demodulation by a device such as up/down converter 42. Some of the components of television signal 20 are separated, processed, then recombination with the other components, and Radio Frequency (RF) modulated for output to receiver 19. The video demodulator 43 sends the demodulated baseband video component to RF modulator 45 for recombination with the other components of television signal 20 and for RF modulation. Inter-carrier detector 44 sends television signal 20 to 5.5 MHz band pass filter 46 for main audio signal 22 separation and modulation. The main audio signal 22 portion of television signal 20 is passed from the 5.5 MHz band pass filter 46 to a frequency modulation (FM) demodulator 47 and then to the RF modulator 45 for recombination with the other components of television signal 20, for RF modulation, and for output to receiver 19.

The auxiliary audio signal 21 portion of television signal 20 is also separated and modified within HCT 19. Intercarrier detector 44 also sends at least a portion of television signal 20 to 5.85 MHz band pass filter 48 for auxiliary audio signal 21 separation. The 5.85 MHz band pass filter 48 separates out signals in a range around the 5.85 auxiliary audio carrier and passes the signals within the range to amplifier 49. The signals are amplified at amplifier 49 to improve detection of auxiliary audio signal 21. The signal is then passed to mute switch 21 and to sound trap 50. Based on the setting of mute switch 21 the signal is or is not passed to RF modulator 45 for recombination with the other components of television signal 20, for RF modulation, and for output to receiver 19. The setting of mute switch is determined by both the detection of an auxiliary audio signal 21 and by the type of receiver 19 to which the RF output will go.

In this exemplary embodiment the detection of an auxiliary audio signal 21 for a particular channel is achieved by sound trap 50, signal level detector 52, and comparator 53. The signal is run through sound trap 50 to reduce the amplitude of any signal around 5.5 MHz where any remaining portions of the main audio signal 22 would be and then passed to signal level detector 52. Signal level detector 52 indicates the strength of the signal received from sound trap 50 in the bandwidth of the auxiliary audio signal 21. Signal level detector 52 outputs a signal to comparator 53. Comparator 53 determines if the strength of the signal, as received from signal level detector 52, indicates the presence of auxiliary audio signal 21. If the signal level indicates auxiliary audio signal 21 is present, the comparator 53 signals mute switch 51 to allow the output of auxiliary audio signal 21 to RF modulator 45.

Mute switch 51 requires an allowable indication from both comparator 53 and from MPU 54 before it allows the output of auxiliary audio signal 21. The normal position of mute switch 51 is muted or output disallowed. The signal from comparator 53 to mute switch 51 solves the problem of audio whistle when a stereo television tunes to a channel with only monophonic audio by eliminating the output of auxiliary audio signal 21 to RF modulator 45 when auxiliary audio signal 21 is not present. The auxiliary audio processing circuitry in the stereo television does not try to tune to the auxiliary audio signal 21 because no auxiliary audio signal 21 is output from HCT 18.

Control of mute switch 51 based on the type of receiver 19 connected to HCT 18, is achieved by MPU 54. MPU 54 receives input 55 as to the type of receiver 19 connected to HCT 18. The input 55 can be provided in many ways. For example, input 55 can be provided directly to HCT 18 via HCT 18 front panel keystrokes by the subscriber. Input 55 could be provided via infra-red radiation (IR) input by the subscriber to HCT 18 from a remote control device based on a set-up display screen displayed on a television. If input 55 indicates to MPU 54 that the receiver 19 is a stereo receiver, MPU 54 signals mute switch 51 to be controlled only by comparator 53. If it is indicated that receiver 19 is a monophonic receiver, MPU 54 signals mute switch 51 to always disallow or mute auxiliary audio signal 21. The instruction from MPU 54 to mute switch 51 solves the problem of audio whistle on monophonic televisions in television system 30 when auxiliary audio signal 21 is adjacent to a main audio signal 22. In this case mute switch 51 disallows output of auxiliary audio signal 21 even if comparator 53 indicates an auxiliary audio signal 21 is present. No auxiliary audio signal 21 is output from HCT 18 to cause audio anomalies on the monophonic television.

RF modulator 45 recombines the baseband video, the FM demodulated main audio signal 22, and, when allowed by mute switch 54, the auxiliary audio signal 21 into a RF output 56 to receiver 19.

The present invention allows HCT 18 in television system 10 with auxiliary audio signal 21 on one or more channels and with multiple receiver 19 types to eliminate audio anomalies. Additionally, HCT 18 with the present invention can function in television system 10 when none of the channels have auxiliary audio signal 21 or any additional audio options.

The present invention can be applied to other audio signaling and formats such as stereo audio signals and multiple music channels, and to other television formats such as Pal-I.

Conclusion

From the foregoing, it will be appreciated that the present invention provides a method for controlling audio anomalies in signals which may have an auxiliary audio signal 21 adjacent to main audio signal 22. In an exemplary embodiment, the present invention controls audio anomalies in television signal 20 which may have an NICAM audio signal adjacent to a main audio signal 22 on some of the channels. Those skilled in the art will appreciate that the present invention is not limited to the described techniques, and that a variety of techniques and processes may be developed to accomplish these tasks. For example, the determination of the type of receiver 19 connected to HCT 18 could be done automatically via a feedback or two-way connection from a television to HCT 18. Other methods of inputting receiver 19 type can be used such as a wired remote control input. The present invention does not require a deeper notch and as such does not introduce the excessive group delays which cause the audio pop.

In conclusion, while exemplary embodiments of the invention have been illustrated and described, it will be clear that the invention is not so limited. Numerous modifications, changes, variations, substitutions, and equivalents will occur to those skilled in the art, without departing from the spirit and scope of the present invention as defined by the appended claims.

What is claimed is:

1. An apparatus for controlling audio anomalies in a television signal having a first and second channel signal and having a first audio signal, the television signal being processed by an intermediate device operatively coupled to a receiver, the apparatus comprising:

a band pass filter for isolating a second audio signal within the first channel signal of the television signal, and outputting the second audio signal;

an amplifier for boosting amplitude of the second audio signal received from the band pass filter and outputting the second audio signal;

a sound trap for receiving the second audio signal from the amplifier, reducing a portion of the second audio signal associated with the first audio signal and outputting the second audio signal;

a signal level detector for determining and outputting an indication of a signal level of the second audio signal received from the sound trap;

a comparator for determining and for outputting an indication of a presence of the second audio signal in the first channel signal, based on the indication received from the signal level detector;

a microprocessor for receiving input, processing information, and outputting an indication of an ability to receive the second audio signal of the receiver;

a mute switch for receiving input from the comparator, the microprocessor, and the amplifier, for allowing output of the second audio signal received from the amplifier based on the receiver being tuned to the first channel signal and on the indication of the comparator of the presence of the second signal in the first channel signal and based on the indication from the microprocessor of the ability of the receiver to receive the second audio signal, and for preventing output of the second audio signal at all other times; and a modulator for recombining the second audio signal received from the mute switch with the first audio signal for output to the receiver.

2. The apparatus of claim 1, the apparatus further comprising:

a means for communicating to the microprocessor the receivers ability to receive the second audio signal.

3. The apparatus of claim 2, wherein the means for communicating to the microprocessor is capable of receiving user input based on a set-up screen displayed on the receiver.

* * * * *